(12) United States Patent
Nonaka et al.

(10) Patent No.: US 11,237,182 B2
(45) Date of Patent: Feb. 1, 2022

(54) AUTOMATIC ANALYZER

(71) Applicant: HITACHI HIGH-TECHNOLOGIES CORPORATION, Tokyo (JP)

(72) Inventors: Kohei Nonaka, Tokyo (JP); Takamichi Mori, Tokyo (JP); Masato Ishizawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 369 days.

(21) Appl. No.: 16/075,682

(22) PCT Filed: Jan. 23, 2017

(86) PCT No.: PCT/JP2017/002072
§ 371 (c)(1),
(2) Date: Aug. 6, 2018

(87) PCT Pub. No.: WO2017/141626
PCT Pub. Date: Aug. 24, 2017

(65) Prior Publication Data
US 2019/0041415 A1    Feb. 7, 2019

(30) Foreign Application Priority Data
Feb. 19, 2016 (JP) .............................. JP2016-029451

(51) Int. Cl.
*G01N 35/10* (2006.01)
*G01N 35/00* (2006.01)
*G01N 35/04* (2006.01)

(52) U.S. Cl.
CPC ... *G01N 35/1004* (2013.01); *G01N 35/00584* (2013.01); *G01N 35/04* (2013.01);
(Continued)

(58) Field of Classification Search
None
See application file for complete search history.

(56) References Cited

U.S. PATENT DOCUMENTS 6,066,298 A * 5/2000 Fukunaga ................ G01N 1/38
134/170
2013/0125671 A1  5/2013  Sakashita et al.
2016/0193622 A1  7/2016  Miyakawa et al.

FOREIGN PATENT DOCUMENTS

JP        06222036 A  *  8/1994
JP        3110618 U     6/2005
(Continued)

OTHER PUBLICATIONS

Machine-generated English translation of JP 06-222036 to Tokunaga (Year: 1994), pp. 1-5.*

(Continued)

*Primary Examiner* — Kathryn Wright
(74) *Attorney, Agent, or Firm* — Mattingly & Malur, PC

(57) ABSTRACT

To clean a reagent probe 7a, 8a or a sample probe 11a, 12a with a heated cleaning solution, after a first cleaning solution is caused to overflow from a first cleaning container 23 or a second cleaning container 24, the first cleaning solution is temporarily drawn back into the cleaning-solution heating passage 125 to be heated by the heating mechanism 123. After the heating, the first cleaning solution thus heated is re-supplied to the first cleaning container 23 or the second cleaning container 24. As a result, the cleaning solution heated to clean a dispensing probe can be supplied to a cleaning bath with efficiency.

9 Claims, 14 Drawing Sheets

(52) U.S. Cl.
CPC ............... *G01N 35/1002* (2013.01); *G01N 2035/00425* (2013.01); *G01N 2035/0443* (2013.01); *G01N 2035/0444* (2013.01); *G01N 2035/0453* (2013.01)

(56) References Cited

FOREIGN PATENT DOCUMENTS

| | | |
|---|---|---|
| JP | 2005-274470 A | 10/2005 |
| JP | 2010-210596 A | 9/2010 |
| JP | 2012-026732 A | 2/2012 |
| WO | 2015/037339 A1 | 3/2015 |

OTHER PUBLICATIONS

International Preliminary Report on Patentability received in corresponding International Application No. PCT/JP2017/002072 dated Aug. 30, 2018.
International Search Report of PCT/JP2017/002072 dated Apr. 11, 2017.

* cited by examiner

AUTOMATIC ANALYZER

TECHNICAL FIELD

The present invention relates to an automatic analyzer that performs qualitative/quantitative analysis on a biological sample, such as blood, urine or the like, held in a sample container.

BACKGROUND ART

Patent Literature 1 discloses supplying a preheated cleaning solution into a cleaning bath through a heat-insulated passage and using the cleaning solution to clean a reagent probe.

CITATION LIST

Patent Literature

Patent Literature 1: Japanese Unexamined Patent Application Publication No. 2012-26732

SUMMARY OF INVENTION

Technical Problem

In the automatic analyzers that performs qualitative/quantitative analysis on a biological sample such as blood and urine (hereinafter referred to as a "sample"), a probe used to dispense a sample to be analyzed is cleaned as appropriate in order to inhibit an occurrence of cross-contamination for the maintenance of analysis accuracy.

As a technique about the cleaning of a sample dispensing probe, using a high-temperature cleaning solution enables enhancement in the degree of probe cleaning effectiveness.

Meanwhile, for ways to cause a temperature rise of a cleaning solution for cleaning a probe used in the sample dispensing, there are two methods, a method of directly heating a reservoir to increase the temperature of the cleaning solution and a method of preheating the cleaning solution prior to being supplied into a reservoir.

In the former method of directly heating the reservoir, there is a need for a heating mechanism to be placed around the reservoir, giving rise to a disadvantageous increase in size of the reservoir. Further, since the interior of the reservoir has a smaller surface area as compared with the volume of the cleaning solution in the reservoir, a heat transfer from the reservoir to the cleaning solution is inefficient. This gives rise to disadvantages such as much time required for a temperature rise to reach a target temperature of the cleaning solution, temperature non-uniformities developing within the cleaning solution, and/or the like.

In the latter method of supplying the preheated cleaning solution into the reservoir, by supplying the preheated cleaning solution into the reservoir as appropriate, a high-temperature cleaning solution can be provided in a short length of time even when it is determined that a probe needs cleaning, leading to shortening of cleaning time. However, an upper portion of the reservoir is in the open state for the probe cleaning. Therefore, even if a heat insulator is placed around the reservoir, there is a disadvantage that the cleaning solution in the reservoir decreases in temperature over time.

Methods for the operation of replacing the cleaning solution decreased in temperature with a high-temperature cleaning solution include a replacement method of removing the cleaning solution from the reservoir and then supplying a high-temperature cleaning solution, and a method of supplying a high-temperature cleaning solution in the manner of pushing out the cleaning solution from the reservoir.

In the former operation, there is a disadvantage that an electromagnetic valve and/or the like is required to remove the cleaning solution from the reservoir, leading to an increase in costs and a waste of the cleaning solution.

The latter operation is the method of allowing replacement in the manner of pushing out the cleaning solution having decreased temperature. However, fluid has the property of slowing more down as it moves closer to a wall due to frictional resistance developing between the cleaning solution and the inner wall of the reservoir. Therefore, in the replacement of a room-temperature cleaning solution with a high-temperature cleaning solution, because the room-temperature cleaning solution is apt to remain close to the wall, the cleaning solution to be supplied is required to be heated to a temperature higher than a target temperature, leading to a disadvantage of being inefficient.

The present invention has been made in view of the forgoing and it is an object of the present invention is to provide an automatic analyzer capable of supplying a heated cleaning solution for cleaning of a dispensing probe into a cleaning bath with efficiency.

Solution to Problem

To solve the above problems, for example, the configuration disclosed in the claims may be employed.

The present invention includes a plurality of technical solutions to the problems, one example of which is an automatic analyzer that dispenses a sample and a reagent into each reaction container to initiate a reaction and then measures the reacted liquid, the automatic analyzer including: a dispensing probe for dispensing a reagent or a sample to be analyzed into the reaction container; a cleaning container that holds a cleaning solution for cleaning the dispensing probe, the dispensing probe being inserted into the cleaning solution to be cleaned; a cleaning-solution supply unit that supplies the cleaning solution to the cleaning container through a passage leading to the cleaning container, to perform a cleaning process on the dispensing probe; a heating unit that is thermally connected to the passage to heat the cleaning solution to be supplied to the cleaning container; and a controller that controls the heating unit and the cleaning-solution supply unit such that, after the cleaning solution is caused to overflow from the cleaning container, the cleaning solution is drawn back into the passage to be heated by the heating unit, and, after the heating, the cleaning solution thus heated is ejected into the cleaning container.

Advantageous Effects of Invention

According to the present invention, a heated cleaning solution for cleaning a dispensing probe can be supplied to a cleaning bath in shorter lengths of time and with more efficiency than ever before, and a reduction in the waste of a cleaning solution can be achieved. The above and other aspects, features and advantageous effects will be more apparent form the following descriptions of embodiments.

DESCRIPTION OF EMBODIMENTS

Figure 1:
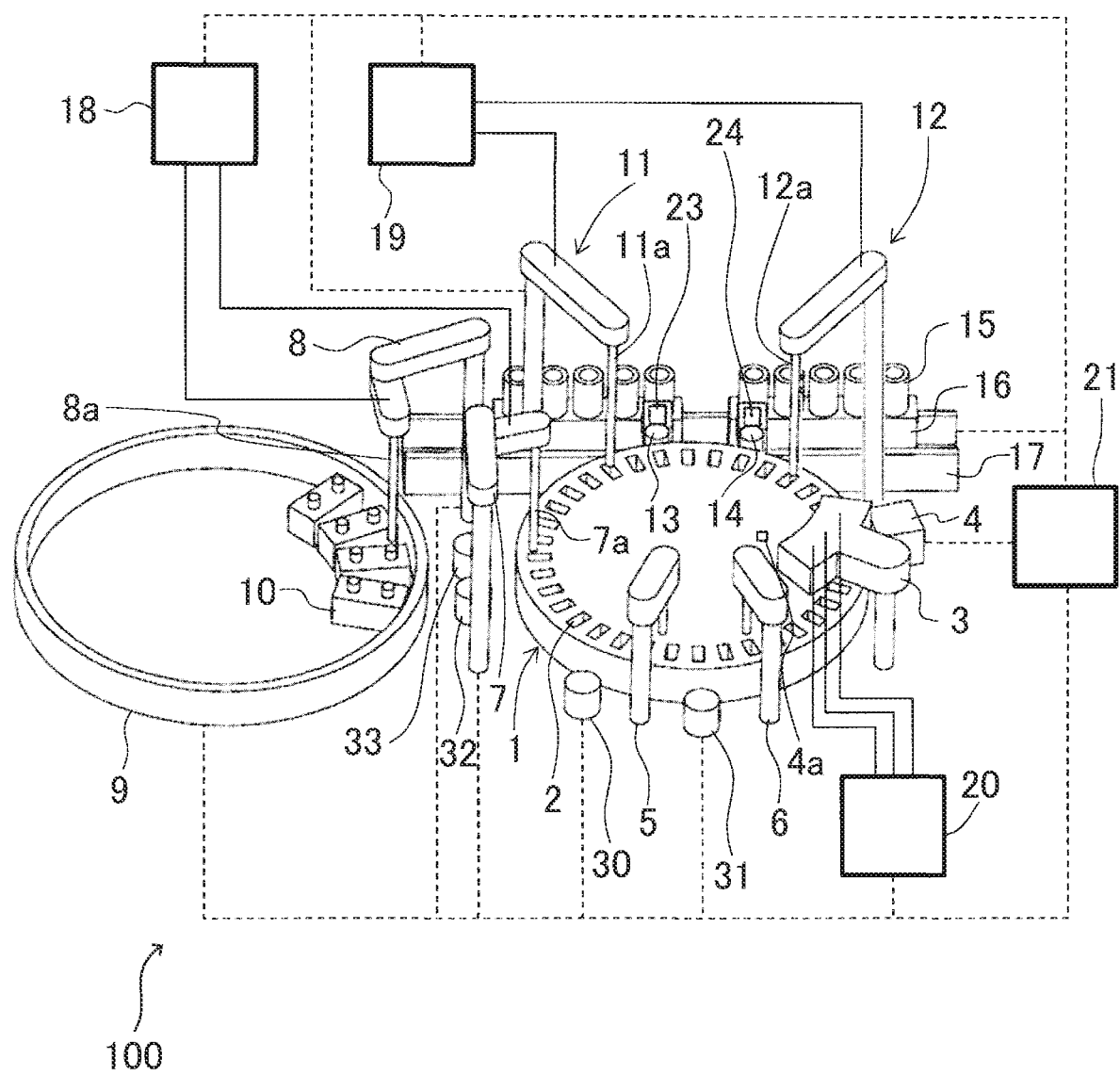
FIG. 1 is a schematic diagram of the overall configuration of an automatic analyzer in accordance with an embodiment of the present invention.

An embodiment of an automatic analyzer according to the present invention will now be described with reference to FIG. 1 to FIG. 20. FIG. 1 is a schematic diagram of the overall configuration of an automatic analyzer in accordance with the embodiment.

In FIG. 1, an automatic analyzer 100 is an apparatus that dispenses a sample and a reagent into each reaction container 2 to initiate a reaction and then measures the reacted liquid. The automatic analyzer 100 roughly includes a sample transfer mechanism 17, a reagent disk 9, a reaction disk 1, a first sample dispensing mechanism 11, a second sample dispensing mechanism 12, reagent dispensing mechanisms 7, 8, agitation mechanisms 5, 6, a light source 4a, a spectrophotometer 4, a cleaning mechanism 3, and a controller 21.

Reaction containers 2 are circularly arranged in the reaction disk 1. The reaction containers 2 are containers each for holding a liquid mixture made by mixing a sample and a reagent, and are arranged in plural on the reaction disk 1. In the proximity of the reaction disk 1, a sample transfer mechanism 17 is placed to transfer a sample rack 16 on which one or more sample containers 15 each holding a biological sample such as blood, urine and/or the like (hereinafter simply referred to as a "sample") to be analyzed are loaded.

A first sample dispensing mechanism 11 and a second sample dispensing mechanism 12, which are rotatable and vertically movable, are placed between the reaction disk 1 and the sample transfer mechanism 17.

The first sample dispensing mechanism 11 has a sample probe 11a having a distal end facing downward, and a sample pump 19 is connected to the sample probe 11a. The first sample dispensing mechanism 11 is configured to be operable to rotate in the horizontal direction and to move in the vertical direction. After the sample probe 11a is inserted into the sample container 15, the sample pump 19 is actuated to suck a sample. Then, the sample probe 11a is inserted into the reaction container 2, and then ejects the sample, thereby dispensing the sample from from the sample container 15 into the reaction container 2. A cleaning bath 13 in which the sample probe 11a is cleaned with a regular cleaning solution, and a first cleaning container 23 in which the sample probe 11a is cleaned with a special cleaning solution are placed within the operating range of the first sample dispensing mechanism 11.

The second sample dispensing mechanism 12 has a sample probe 12a having a distal end facing downward, and the sample pump 19 is connected to the sample probe 12a. The second sample dispensing mechanism 12 is configured to be operable to rotate in the horizontal direction and to move in the vertical direction. After the sample probe 12a is inserted into the sample container 15, the sample pump 19 is actuated to suck a sample. Then, the sample probe 12a is inserted into the reaction container 2, and then ejects the sample, thereby dispensing the sample from from the sample container 15 into the reaction container 2. A cleaning bath 14 in which the sample probe 12a is cleaned with a regular cleaning solution, and a second cleaning container 24 in which the sample probe 12a is cleaned with a special cleaning solution are placed within the operating range of the second sample dispensing mechanism 12.

The cleaning bathes 13, 14 are cleaning bathes for cleaning the outer sides and the inner sides of the respective sample probes 11a, 12a after used in sample dispensing every time sample dispensing is performed. On the other hand, the first cleaning container 23 and the second cleaning container 24 are sections for additional cleaning process. Where a request is received to perform measurement of a pre-registered analysis item on a sample in a pre-registered specimen category, before the sample is analyzed, the additional cleaning process is performed on the sample probes 11a, 12a. Details thereof will be described later.

The reagent disk 9 is a depository on which a plurality of reagent bottles 10 contained reagents can be placed in a circle. The reagent disk 9 is maintained in cool condition.

The reagent dispensing mechanisms 7, 8 are placed between the reaction disk 1 and the reagent disk 9, which are configured to be operable to rotate in the horizontal direction and to move in the vertical direction and are provided to dispense a reagent from the reagent bottle 10 into the reaction container 2. The reagent dispensing mechanisms 7, 8 respectively include reagent probes 7a, 8a respectively having distal ends facing downward. A reagent pump 18 is connected to the reagent probes 7a, 8a. The reagent pump 18 causes a reagent, a detergent, a diluent solution, a pretreatment reagent or the like to be sucked from the reagent bottle 10 or the like through the reagent probe 7a, 8a in order to be dispensed into the reaction containers 2.

A cleaning bath 32 in which the reagent probe 7a is cleaned with a cleaning solution is placed within the operating range of the reagent dispensing mechanism 7, and a cleaning bath 33 in which the reagent probe 8a is cleaned with a cleaning solution is placed within the operating range of the reagent dispensing mechanism 8.

The agitation mechanisms 5, 6, the spectrophotometer 4, the cleaning mechanism 3 and the like are placed around the reaction disk 101, in which the agitation mechanisms 5, 6 each stir a liquid mixture (reaction liquid) of a sample and a reagent which have been dispensed into the reaction container 2, the spectrophotometer 4 measures transmitted light coming through the reaction liquid in the reaction container 2 from a light source 4a in order to measure an absorbance of the reaction liquid, the cleaning mechanism 3, and the cleaning mechanism 3 cleans the reaction container 2 after use.

The agitation mechanisms 5, 6 are each configured to be operable to rotate in the horizontal direction and to move in the vertical direction, each of which is inserted into the reaction container 2 to stir a liquid mixture (reaction liquid) of a sample and a reagent. Cleaning bathes 30, 31 in which the agitation mechanisms 5, 6 are cleaned with a cleaning solution are placed within the operating ranges of the agitation mechanisms 5, 6. Further, the cleaning mechanism 3 is connected to a cleaning pump 20.

The controller 21 includes a computer and/or the like to control operation of each of the above-described mechanisms in the automatic analyzer and also performs arithmetic processing to determine a concentration of a predetermined component in a liquid sample such as blood, urine or the like. Incidentally, in FIG. 1, some of the connections between the controller 21 and the mechanisms included in the automatic analyzer 100 are omitted to be shown for the sake of simplicity.

A typical configuration of automatic analyzers has been described.

The analysis process for a testing sample by an automatic analyzer as described above is carried out typically according to the following procedure.

Initially, a sample container 15 loaded on the sample rack 16 is carried to near the reaction disk 1 by the sample transfer mechanism 17, and a sample in the sample container 15 is dispensed into a reaction container 2 on the reaction disk 1 by the sample probe 11a of the first sample dispensing mechanism 11 or the sample probe 12a of the second sample dispensing mechanism 12. Then, a reagent to be used for analysis is dispensed from a reagent bottle 10 on the reagent disk 9 into the reaction container 2 into which the sample has been dispensed, by the reagent probe 7a, 8a of the reagent dispensing mechanism 7, 8. Subsequently, agitation of a liquid mixture of the sample and the reagent in the reaction container 2 is performed by the agitation mechanism 5, 6.

After that, light is emitted from the light source 4a to pass through the reaction container 2 containing the liquid mixture, and then an intensity of the transmitted light is measured by the spectrophotometer 4. The intensity measured by the spectrophotometer 4 is transmitted through an A/D converter and an interface to the controller 21. Then, the controller 21 performs arithmetic to determine a concentration of a predetermined analysis item component responsive to the reagent, and causes a display unit (not shown) or the like to display the result of the arithmetic.

Figure 2:
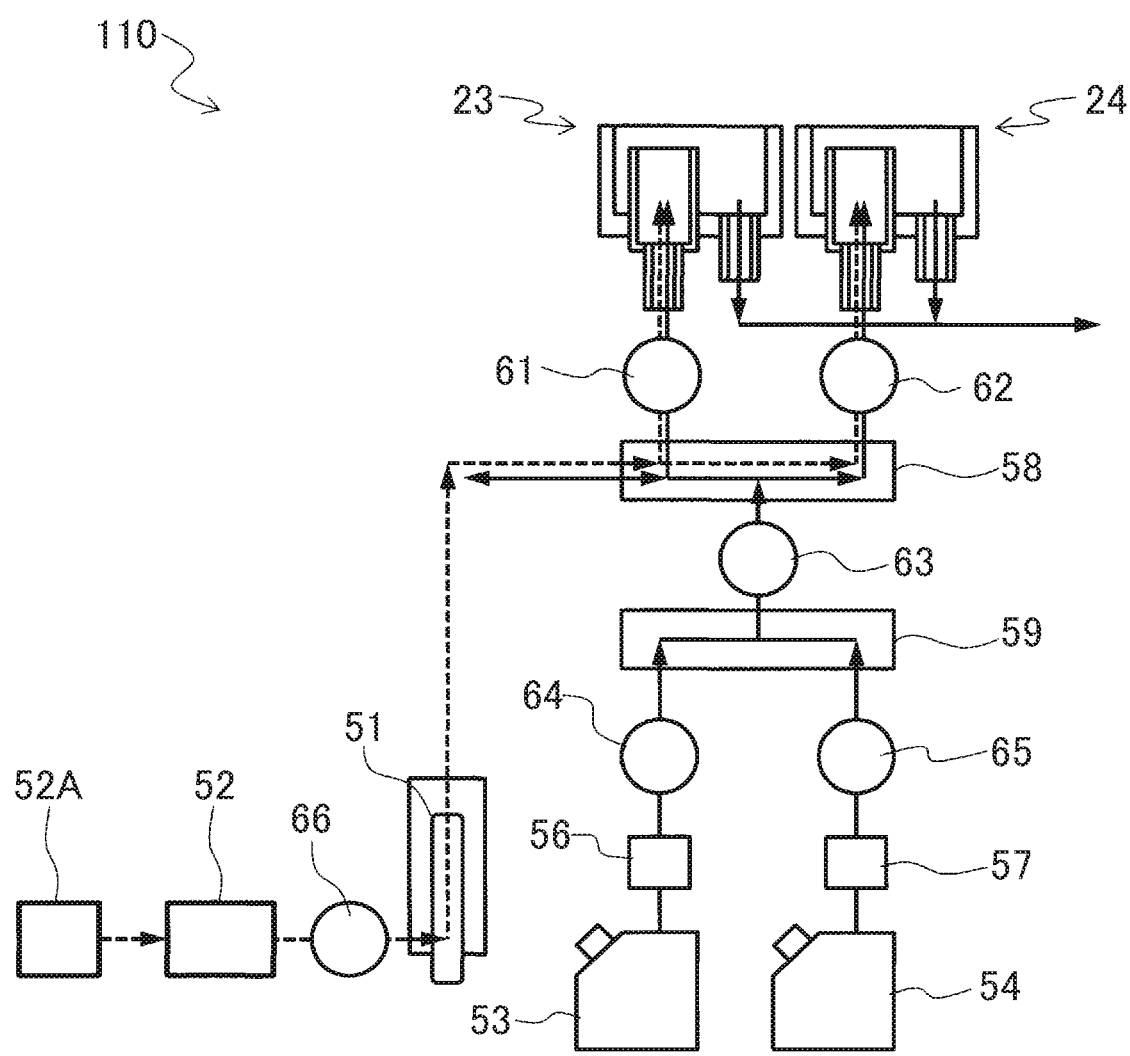
FIG. 2 is a diagrammatic representation of the overall configuration of a cleaning-solution supply mechanism.

Next, a configuration of a cleaning-solution supply mechanism 110 will be described with reference to FIG. 2. FIG. 2 is a schematic diagram illustrating the overall configuration of the cleaning-solution supply mechanism 110. It is noted that in the embodiment a description is given of form that supplies a cleaning solution to the first cleaning container 23 and the second cleaning container 24 to clean the sample probes 11a, 12a, but a dispensing probe to be cleaned in the cleaning container is not limited to the sample probes 11a, 12a, and the reagent probes 7a, 8a used to dispense reagents from the reagent bottles 10 into the reaction containers, a sample probe (ISE probe) of an electrolyte analyzer, and the like are also subject to be cleaned.

In FIG. 2, the cleaning-solution supply mechanism 110 is a mechanism that supplies a cleaning solution to the first cleaning container 23 for performing the additional cleaning process (described later) on the sample probe 11a of the sample dispensing mechanism 11 and to the second cleaning container 24 for performing the additional cleaning process on the sample probe 12a of the sample dispensing mechanism 12. The cleaning-solution supply mechanism 110 roughly includes a cleaning-solution supply pump 52, a cleaning-solution supply syringe 51, an electromagnetic valve 66, cleaning-solution residual-amount sensors 56, 57, a first branch pipe 59, electromagnetic valves 64, 65, a second branch pipe 58, an electromagnetic valve 63, and electromagnetic valves 61, 62.

The cleaning-solution supply pump 52 delivers a second cleaning solution from a cleaning-solution storage tank 52A containing the second cleaning solution. The cleaning-solution supply syringe 51 further delivers, in a downstream direction, the second cleaning solution delivered from the cleaning-solution supply pump 52. The electromagnetic valve 66 controls the flow of the second cleaning solution flowing from the cleaning-solution supply pump 52 to the cleaning-solution supply syringe 51. The first branch pipe 59 is a confluence of a first cleaning solution delivered from cleaning-solution storage tanks 53, 54 containing the first cleaning solution. The electromagnetic valves 64, 65 respectively control the flow of the first cleaning solution flowing from the cleaning-solution storage tanks 53, 54 to the first branch pipe 59. The second branch pipe 58 is a pipe at which supply lines of the second cleaning solution from the cleaning-solution supply syringe 51 and the first cleaning solution from the first branch pipe 59 are merged, and delivers the second cleaning solution thus supplied or the first cleaning solution thus supplied to the first cleaning container 23 and/or the second cleaning container 24. The electromagnetic valve 63 controls the flow of the first cleaning solution flowing from the first branch pipe 59 to the second branch pipe 58. The electromagnetic valves 61, 62 respectively control the flows of the first cleaning solution and the second cleaning solution flowing from the second branch pipe 58 to the first cleaning container 23 and the second cleaning container 24. The cleaning-solution residual-amount sensors 56, 57 detect the residual quantities of the first cleaning solution in the cleaning-solution storage tanks 53, 54 containing the first cleaning solution.

In the cleaning-solution supply mechanism 110 configured as described above, the first cleaning solution contained in the cleaning-solution storage tanks 53, 54 can be automatically supplied to the first cleaning container 23 and the second cleaning container 24, and also the second cleaning solution can be supplied to the first cleaning container 23 and the second cleaning container 24 by the cleaning-solution supply pump 52. Regarding the cleaning solution stored in the first cleaning container 23 and the second cleaning container 24, in addition to the replacement of the first cleaning solution with the first cleaning solution, the replacement of the first cleaning solution with the second cleaning solution and the replacement of the second cleaning solution with the first cleaning solution are also possible.

Basic operation of the cleaning-solution supply mechanism 110 will now be described. The basic operation of the cleaning-solution supply mechanism 110 described below is basically controlled by the controller 21.

The operation is described where a cleaning solution (for example, the first cleaning solution contaminated by being used in the cleaning process) retained in the first cleaning container 23 is replaced with the clean first cleaning solution delivered from the cleaning-solution storage tank 53.

Initially, the electromagnetic valves 63, 64 are opened and the electromagnetic valves 61, 62, 65, 66 are shut. Subsequently, the cleaning-solution supply syringe 51 is used to draw the first cleaning solution from the first cleaning-solution storage tank 53. This causes the first branch pipe 59, part of the second branch pipe 58 and part of the piping on the cleaning-solution supply syringe 51 side to be filled with the first cleaning solution. Subsequently, the electromagnetic valve 61 is opened and the electromagnetic valves 63, 64 are shut, so that the first cleaning solution filling part of the branch pipes 58, 59 and part of the piping on the cleaning-solution supply syringe 51 side is ejected to be supplied to the first cleaning container 23 by the cleaning-solution supply syringe 51.

Through the above operation, the first cleaning solution retained in the first cleaning container 23 is discharged in the manner of being pushed out by the first cleaning solution thus supplied, so that the cleaning solution retained in the first cleaning container 23 is replaced with the clean first cleaning solution.

The operation is described where a cleaning solution (for example, the first cleaning solution contaminated by being used in the cleaning process) retained in the second cleaning container 24 is replaced with the clean first cleaning solution delivered from the cleaning-solution storage tank 53.

Initially, the electromagnetic valves 63, 64 are opened and the electromagnetic valves 61, 62, 65, 66 are shut. Subsequently, the cleaning-solution supply syringe 51 is used to draw the first cleaning solution from the cleaning-solution storage tank 53. This causes part of the branch pipes 58, 59 and part of the piping on the cleaning-solution supply syringe 51 side to be filled with the first cleaning solution. Subsequently, the electromagnetic valve 62 is opened and the electromagnetic valves 63, 64 are shut, so that the first cleaning solution filling part of the branch pipes 58, 59 and part of the piping on the cleaning-solution supply syringe 51 side is ejected to be supplied to the first cleaning container 23 by the cleaning-solution supply syringe 51.

Through the above operation, the first cleaning solution retained in the second cleaning container 24 is discharged in the manner of being pushed out by the first cleaning solution thus supplied, so that the cleaning solution retained in the second cleaning container 24 is replaced with the clean first cleaning solution.

The operation is described where a cleaning solution (for example, the first cleaning solution contaminated by being used in the cleaning process) retained in the first cleaning container 23 is replaced with the clean first cleaning solution delivered from the cleaning-solution storage tank 54.

Initially, the electromagnetic valves 63, 65 are opened and the electromagnetic valves 61, 62, 64, 66 are shut. Subsequently, the cleaning-solution supply syringe 51 is used to draw the first cleaning solution from the cleaning-solution storage tank 54. This causes part of the branch pipes 58, 59 and part of the piping on the cleaning-solution supply syringe 51 side to be filled with the first cleaning solution. Subsequently, the electromagnetic valve 61 is opened and the electromagnetic valves 63, 65 are shut, so that the first cleaning solution filling part of the branch pipes 58, 59 and part of the piping on the cleaning-solution supply syringe 51 side is ejected to be supplied to the first cleaning container 23 by the cleaning-solution supply syringe 51.

Through the above operation, the first cleaning solution retained in the first cleaning container 23 is discharged in the manner of being pushed out by the first cleaning solution thus supplied, so that the cleaning solution retained in the first cleaning container 23 is replaced with the clean first cleaning solution.

The operation is described where a cleaning solution (for example, the first cleaning solution contaminated by being used in the cleaning process) retained in the second cleaning container 24 is replaced with the clean first cleaning solution delivered from the cleaning-solution storage tank 54.

Initially, the electromagnetic valves 63, 65 are opened and the electromagnetic valves 61, 62, 64, 66 are shut. Subsequently, the cleaning-solution supply syringe 51 is used to draw the first cleaning solution from the cleaning-solution storage tank 54. This causes part of the branch pipes 58, 59 and part of the piping on the cleaning-solution supply syringe 51 side to be filled with the first cleaning solution. Subsequently, the electromagnetic valve 62 is opened and the electromagnetic valves 63, 65 are shut, so that the first cleaning solution filling part of the branch pipes 58, 59 and part of the piping on the cleaning-solution supply syringe 51 side is ejected to be supplied to the second cleaning container 24 by the cleaning-solution supply syringe 51.

Through the above operation, the first cleaning solution retained in the second cleaning container 24 is discharged in the manner of being pushed out by the first cleaning solution thus supplied, so that the cleaning solution retained in the second cleaning container 24 is replaced with the clean first cleaning solution.

The operation is described where the cleaning solution retained in the first cleaning container 23 is drawn back into the piping on the electromagnetic valve 61 side.

Initially, the electromagnetic valve 61 is opened and the electromagnetic valves 62, 63, 66 are shut. Subsequently, the cleaning-solution supply syringe 51 is used to suck the cleaning solution retained in the first cleaning container 23. This causes part of the piping on the electromagnetic valve 61 side, part of the branch pipe 58 and part of the piping on the cleaning-solution supply syringe 51 side to be filled with the cleaning solution which has been retained in the first cleaning container 23. The amount of cleaning solution drawn back may be all or only some of the cleaning solution in the reservoir.

For re-supplying the drawn-back cleaning solution into the first cleaning container 23, the electromagnetic valve 61 is opened and the electromagnetic valves 62, 63, 66 are shut. Subsequently, by use of the cleaning-solution supply syringe 51, the cleaning solution thus drawn back into the part of the piping on the electromagnetic valve 61 side, the part of the branch pipe 58 and the part of the piping on the cleaning-solution supply syringe 51 side is ejected to be supplied to the first cleaning container 23.

Through the above operation, the cleaning solution in the first cleaning container 23 can be drawn back so that the cleaning solution can be re-supplied into the first cleaning container 23.

The operation is described where the cleaning solution retained in the second cleaning container 24 is drawn back into the piping on the electromagnetic valve 62 side.

Initially, the electromagnetic valve 62 is opened and the electromagnetic valves 61, 63, 66 are shut. Subsequently, the cleaning-solution supply syringe 51 is used to suck the cleaning solution retained in the second cleaning container 24. This causes part of the piping on the electromagnetic valve 62 side, part of the branch pipe 58 and part of the piping on the cleaning-solution supply syringe 51 side to be filled with the cleaning solution which has been retained in the second cleaning container 24. The amount of cleaning solution drawn back may be all or only some of the cleaning solution in the reservoir.

For re-supplying the drawn-back cleaning solution into the second cleaning container 24, the electromagnetic valve 62 is opened and the electromagnetic valves 61, 63, 66 are shut. Subsequently, by use of the cleaning-solution supply syringe 51, the cleaning solution thus drawn back into the part of the piping on the electromagnetic valve 62 side, the part of the branch pipe 58 and the part of the piping on the cleaning-solution supply syringe 51 side is ejected to be supplied to the second cleaning container 24.

Through the above operation, the cleaning solution in the second cleaning container 24 can be drawn back so that the cleaning solution can be re-supplied into the second cleaning container 24.

The operation is described where a cleaning solution (e.g., the first cleaning solution) retained in the first cleaning container 23 is replaced with the second cleaning solution.

Initially, the electromagnetic valves 61, 66 are opened, the electromagnetic valves 62, 63, 64, 65 are shut, and a cleaning solution is delivered by the cleaning-solution supply pump 52.

Through the above operation, the first cleaning solution retained in the first cleaning container 23 is discharged in the manner of being pushed out by the second cleaning solution thus supplied, so that the cleaning solution retained in the first cleaning container 23 is replaced with the second cleaning solution.

The operation is described where a cleaning solution (e.g., the first cleaning solution) retained in the second cleaning container 24 is replaced with the second cleaning solution.

Initially, the electromagnetic valves 62, 66 are opened, the electromagnetic valves 61, 63, 64, 65 are shut, and a cleaning solution is delivered by the cleaning-solution supply pump 52.

By the above operation, the first cleaning solution retained in the second cleaning container 24 is discharged in the manner of being pushed out by the second cleaning solution thus supplied, so that the cleaning solution retained in the second cleaning container 24 is replaced with the second cleaning solution.

It is noted that fluid volume management can be carried out by the cleaning-solution residual-amount sensors 56, 57 installed in the cleaning-solution storage tanks 53, 54. For example, during the cleaning solution supply from the cleaning-solution storage tank 53, if it is determined from the cleaning-solution residual-amount sensor 56 that the residual amount is zero, the electromagnetic valve 64 is shut and the electromagnetic valve 65 is opened in order to select the cleaning solution supply from the cleaning-solution storage tank 54. Similarly, in the reverse case, during the cleaning solution supply from the cleaning-solution storage tank 54, if it is determined from the cleaning-solution residual-amount sensor 57 that the residual amount is zero, the electromagnetic valve 65 is shut and the electromagnetic valve 64 is opened in order to select the cleaning solution supply from the cleaning-solution storage tank 53. By the above operation, a reduction in the man-hour count for the user managing the cleaning solution is achieved to enable a reduction in risk of stopping the apparatus by alarm during specimen measurement.

Figure 3:
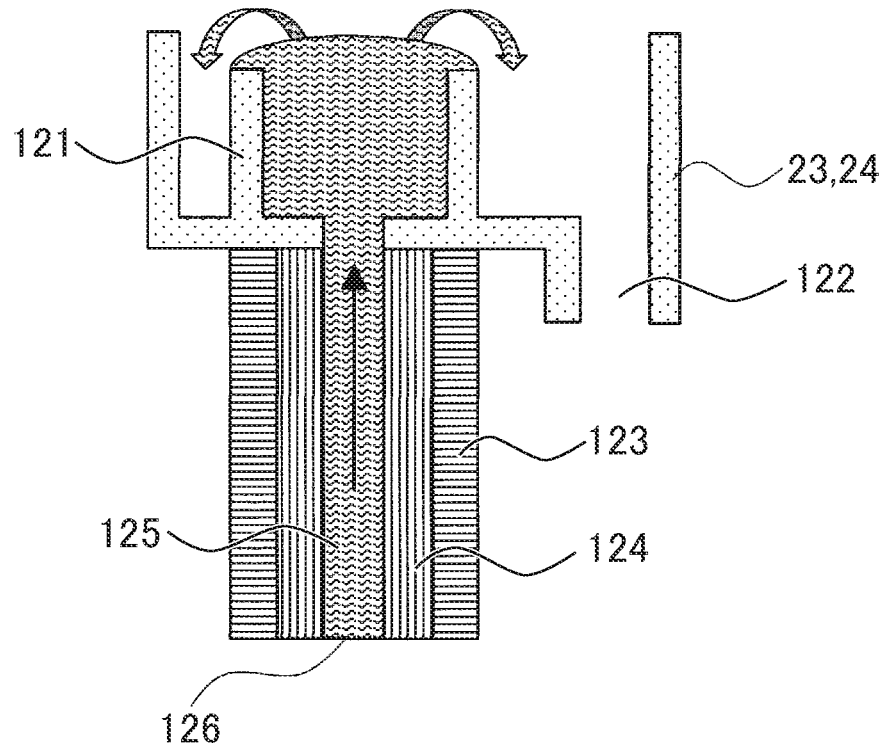
FIG. 3 is a diagrammatic representation of the overall configuration of a cleaning container.
Figure 4:
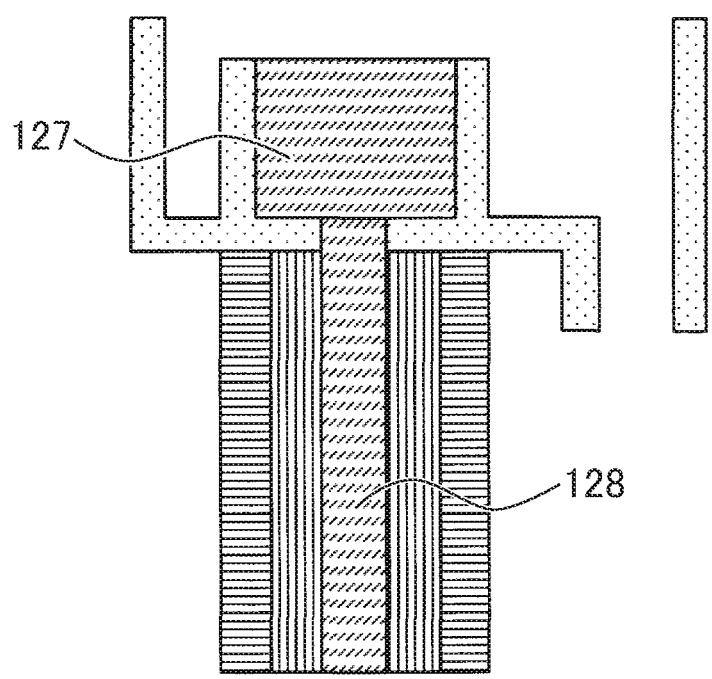
FIG. 4 is a diagram illustrating comparison of the cleaning-solution maximum capacity between a reservoir and a cleaning-solution heating passage.

The configuration of the first cleaning container 23 and the second cleaning container 24 in accordance with the embodiment will now be described in detail with reference to FIG. 3 and FIG. 4. FIG. 3 is a schematic diagram of an example configuration of a cleaning container in accordance with the embodiment. FIG. 4 is a diagram illustrating comparison of the cleaning-solution maximum capacity between a reservoir and a cleaning-solution heating passage.

As illustrated in FIG. 3, the first cleaning container 23 and the second cleaning container 24 each include a reservoir 121 in which the first cleaning solution or the second cleaning solution supplied is retained, and a lower opening 122 from which the first cleaning solution or the second cleaning solution after overflowing from the reservoir 121 is discharged. The first cleaning container 23 and the second cleaning container 24 are each formed from resin or metal having a low thermal conductivity and resistance to cleaning solutions to be used. This can reduce the dissipation of heat from the cleaning solution supplied into the reservoir, so that the cleaning solution in the reservoir can be retained at around a target temperature in a longer length of time.

The first cleaning container 23 and the second cleaning container 24 each have a cleaning-solution heating passage 125 which leads to a cleaning-solution supply port 126 at the bottom of the reservoir 121, the cleaning-solution heating passage 125 through which the first cleaning solution from the cleaning-solution storage tank (s) 53, 54 and the second cleaning solution from the cleaning-solution storage tank 52A are supplied into the first cleaning container 23 or the second cleaning container 24 by the cleaning-solution supply syringe 51. The first cleaning solution or the second cleaning solution supplied into the first cleaning container or the second cleaning container 24 is discharged by overflowing from the top of the reservoir 121 as appropriate.

The cleaning-solution heating passage 125 leading to the cleaning-solution supply port 126 is formed of to-be-heated piping 124 of a slender shape of a sufficiently longer length in the axis direction than the inner diameter in order to heat the first cleaning solution or the second cleaning solution to be held in the first cleaning container 23 or the second cleaning container 24 in a uniform manner in a short length of time. A heating mechanism 123 is placed around the to-be-heated piping 124 such that the heating mechanism 123 is thermally connected through the to-be-heated piping 124 to the cleaning-solution heating passage 125 in order to heat the first cleaning solution or the second cleaning solution to be supplied into the first cleaning container 23 or the second cleaning container 24. The heating mechanism 123 includes equipment giving off heat such as a heater and/or the like. A material of the to-be-heated piping 124 may be a metal having a high thermal conductivity and chemical resistance, and the heating mechanism 123 is placed in the manner of being in intimate contact with the periphery of the to-be-heated piping 124.

The cleaning-solution heating passage 125 has a long full length and a small inner diameter, and has a large surface area causing the cleaning solution to come into contact with the interior of the to-be-heated piping 124. Thereby, the cleaning solution in the cleaning-solution heating passage 125 can be uniformly raised in temperature in a short length of time. Further, as illustrated in FIG. 4, a volume 128 of the first cleaning solution or the second cleaning solution retained in the cleaning-solution heating passage 125 is greater than a volume 127 of the first cleaning solution or the second cleaning solution retained in the reservoir 121.

Further, in the first cleaning container 23 and the second cleaning container 24 in accordance with the embodiment, the controller 21 controls the heating mechanism 23 and the cleaning-solution supply mechanism 110 such that, after the first cleaning solution is caused to overflow from the above-described first cleaning container 23 or second cleaning container 24, the first cleaning solution is drawn back into the cleaning-solution heating passage 125 to be heated by the heating mechanism 123, and then, after the heating, the heated first cleaning solution is ejected into the first cleaning container 23 or second cleaning container 24.

Further, the controller 21 determines whether or not, after additional cleaning of the sample probe 11a, 12a, a request for subsequent additional cleaning of the sample probe 11a, 12a, the reagent probe 7a, 8a with the heated first cleaning solution is received. Then, if it is determined that the request is received, the length of time until the start of the subsequent cleaning is calculated and it is determined whether the first cleaning solution retained in the first cleaning container 23 or the second cleaning container 24 should be replaced with a fresh first cleaning solution or with a second cleaning solution. Then, the controller 21 controls the cleaning-solution supply mechanism 110 to perform replacement.

Further, in the additional cleaning operation for the sample probe 11a, 12a, the controller 21 controls the sample probe 11a, 12a such that the sample probe 11a, 12a is additionally moved down as a function of lowering the liquid level of the first cleaning solution due to suction of the first cleaning solution through the sample probe 11a, 12a. Alternatively, the cleaning-solution supply mechanism 110 is controlled to add the amount of first cleaning solution being sucked by the sample probe 11a, 12a, to the first cleaning solution.

Further, in the additional cleaning by immersing the sample probe 11a, 12a in the first cleaning solution, the controller 21 controls the heating mechanism 123 to increase the temperature of the first cleaning to be higher than that when the sample probe 11a, 12a is cleaned with the heated first cleaning solution.

Further, in the additional cleaning by immersing the sample probe 11a, 12a in the first cleaning solution, the controller 21 controls the cleaning-solution supply mechanism 110 to supply the heated first cleaning solution into the first cleaning container 23 or the second cleaning container 24 at predetermined time intervals.

Further, the controller 21 controls the heating mechanism 123 to start increasing the temperature of the heating mechanism 123 after it is determined that a request for additional cleaning of the sample probe 11a, 12a with the heated first cleaning solution is received.

Figure 5:
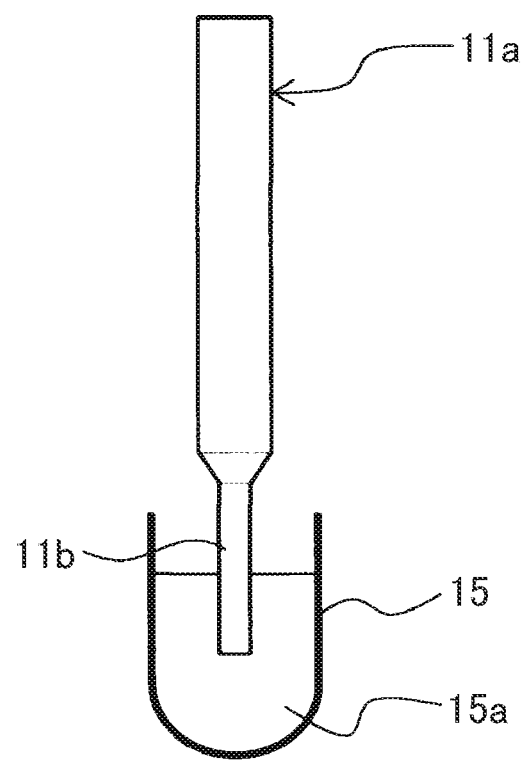
FIG. 5 is a diagram illustrating a state of a sample dispensing process by a first sample dispensing mechanism.

A method of cleaning a dispensing probe in accordance with the embodiment will now be described. First, the sample dispensing process for the sample probe 11a will be described with reference to FIG. 5. FIG. 5 is a diagram illustrating an example state of the sample dispensing process of dispensing the sample contained in the sample container 15 into the reaction container 12 by the sample dispensing mechanism 11. It is noted that the sample probe 11a is shown by way example and the same holds true for the sample probe 12, and the reagent probes 7a, 8a.

As illustrated in FIG. 5, only a distal end 11b of the sample probe 11a is immersed to a depth H1 in a sample 15a subject to be dispensed. For this purpose, in the additional cleaning process in the first cleaning container 23, while the sample probe 11a is immersed to a position a predetermined specified value α1 deeper than the depth H1 (i.e., depth H1+α1) in the cleaning solution retained in the first cleaning container 23, the first cleaning solution is sucked into the sample probe 11a to clean the sample probe 11a.

Figure 6:
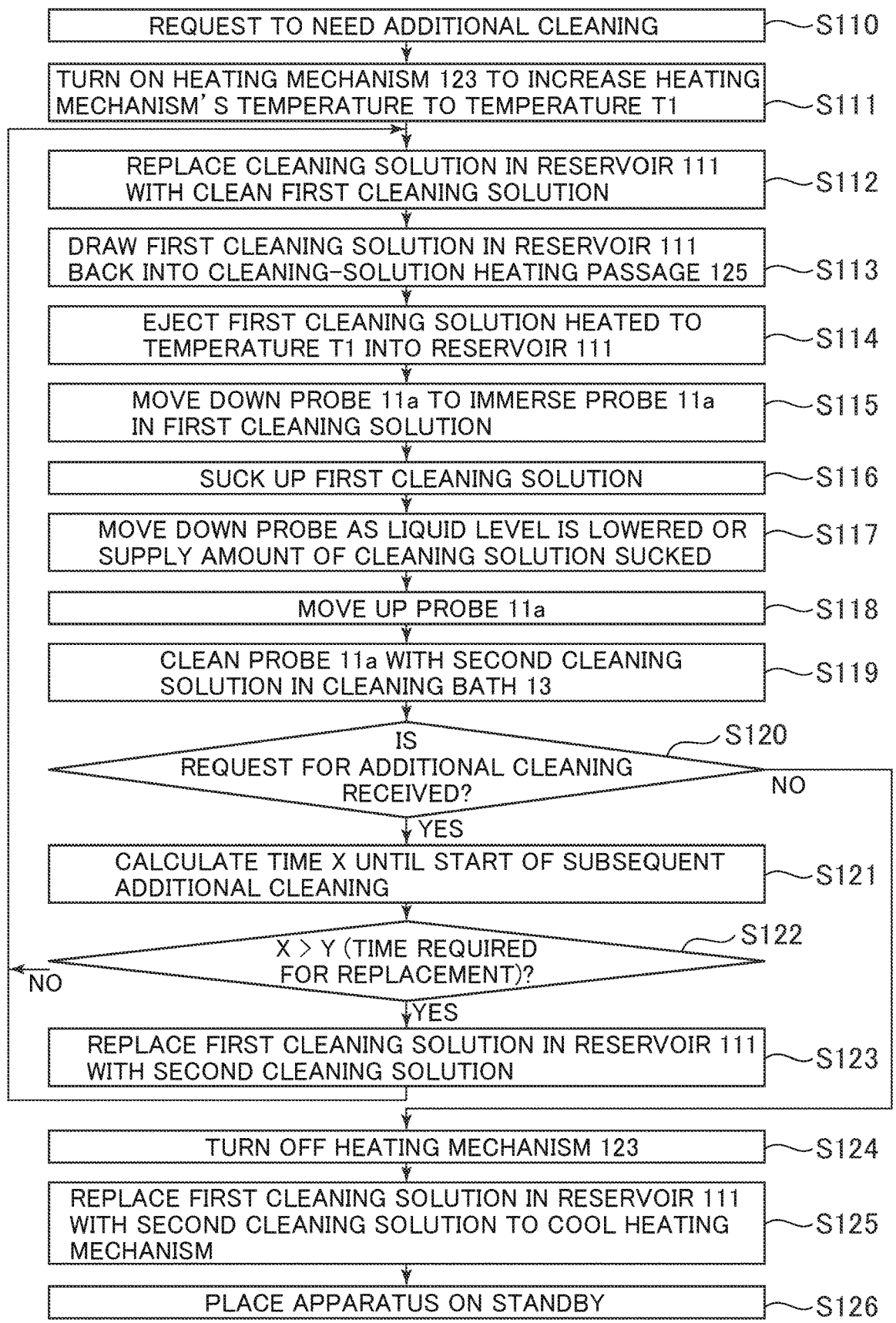
FIG. 6 is a flowchart showing carry-over avoidance cleaning.

Next, the cleaning process for the dispensing probe is described taking the sample probe 11a as an example with reference to FIG. 6 to FIG. 14. FIG. 6 is a flowchart illustrating carry-out avoidance cleaning. FIG. 7 to FIG. 14 are examples of the cleaning process operation for the sample probe 11a.

In the cleaning process for the sample probe 11a during sample analysis, the outer side and the inner side of the sample probe 11a are cleaned in the cleaning bath 13 on a sample basis. However, where a dispensed sample remains in the sample probe 11a, when a to-be-analyzed sample for the next analysis item is dispensed, the sample will be contaminated, and a sample in the sample container in which the to-be-dispensed sample has been held will also be contaminated, causing an occurrence of so-called cross-contamination. Accordingly, for the purpose of avoiding/mitigating such cross-contamination, if a request to perform measurement of a pre-registered analysis item on a sample in a pre-registered specimen category is received, the additional cleaning process (carry-over avoidance cleaning) is performed on the sample probe 11a before the sample is analyzed.

As illustrated in FIG. 6, in the controller 21, at the same time when it is determined that a request to perform measurement of a pre-registered analysis item on a sample in a pre-registered specimen category is received (step S110), the power of the heating mechanism 123 is turned ON (step S111). Upon powering on of the heating mechanism 123, the to-be-heated piping 124 is also started increasing in temperature up to a pre-set temperature T1, but the time for the stabilization at the set temperature T1 is required. Because of this, the temperature rise is produced by effectively using the time period between receiving the measurement request and starting the operation of dispensing a target sample.

Figure 7:
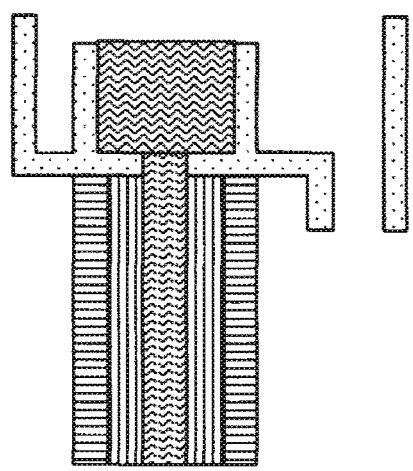
FIG. 7 is a diagram illustrating a state of a reservoir holding a first cleaning solution or a second cleaning solution after it is used in cleaning.
Figure 8:
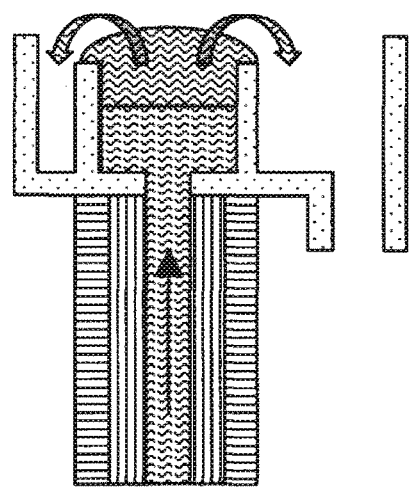
FIG. 8 is a diagram illustrating a state of a clean first cleaning solution being supplied from the bottom of the reservoir to push out the first cleaning solution or the second cleaning solution in the reservoir after used in cleaning.
Figure 9:
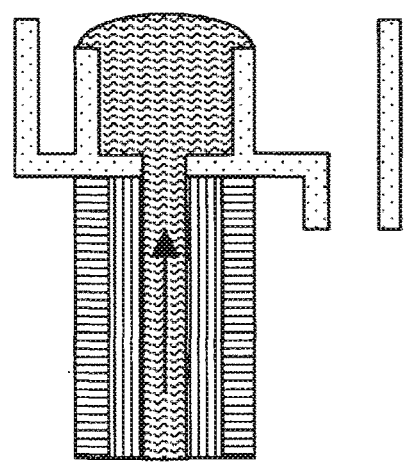
FIG. 9 is a diagram illustrating a state of the reservoir holding a clean first cleaning solution.

While the temperature of the heating mechanism 123 is increased to the temperature T1, the first cleaning solution or the second cleaning solution in the reservoir 121 is replaced with a clean first cleaning solution (step S112, FIG. 7→FIG. 8→FIG. 9). The replacement operation at this time is performed as described earlier.

Figure 10:
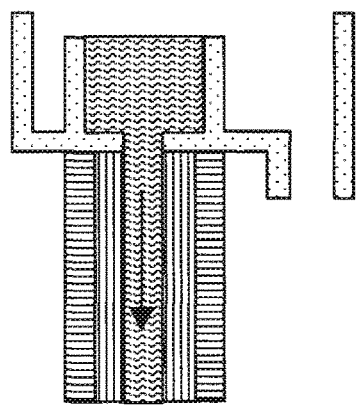
FIG. 10 is a diagram illustrating a state of the first cleaning solution in the reservoir being drawn back into the cleaning-solution heating passage.

Upon checking that the to-be-heated piping 124 reaches the preset temperature T1, the first cleaning solution in the reservoir 121 is drawn back into the cleaning-solution heating passage 125 as illustrated in FIG. 10 (step S113). The operation of drawing back the first cleaning solution is performed as described earlier.

Figure 11:
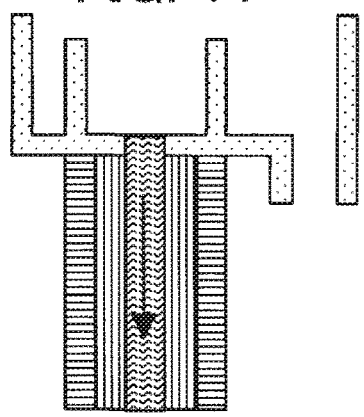
FIG. 11 is a diagram illustrating a state of the first cleaning solution being raised in temperature by a heating mechanism.
Figure 12:
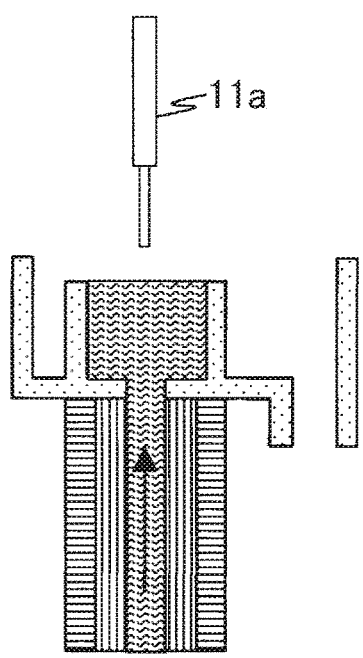
FIG. 12 is a diagram illustrating a state of the first cleaning solution raised in temperature being ejected into the reservoir and a sample probe being moved to above the reservoir.

The first cleaning solution drawn back into the cleaning-solution heating passage 125 is retained in the cleaning-solution heating passage 125 as illustrated in FIG. 11 to be heated to the temperature T1 in a short length of time by means of thermal exchange with the to-be-heated piping 124 raised in temperature. At this time, because the volume of the to-be-heated piping 124 is sufficiently larger than the volume 128 of the cleaning solution retained in the cleaning-solution heating passage 125, even if the first cleaning solution at room temperatures is retained in the cleaning-solution heating passage 125, a temperature drop of the to-be-heated piping 124 is negligible, so that the to-be-heated piping 124 is heated quickly. The first cleaning solution is retained, heated and thermally maintained in the cleaning-solution heating passage 125 until immediately before the sample probe 11a is cleaned.

The first cleaning solution raised in temperature in the cleaning-solution heating passage 125 is ejected into the reservoir 121 immediately before the sample probe 11a is moved down into the reservoir 121 (step S114). The operation of pushing out the first cleaning solution is also performed as described earlier. In this manner, the first cleaning solution heated to the preset temperature T11 is supplied into the reservoir 121.

Figure 13:
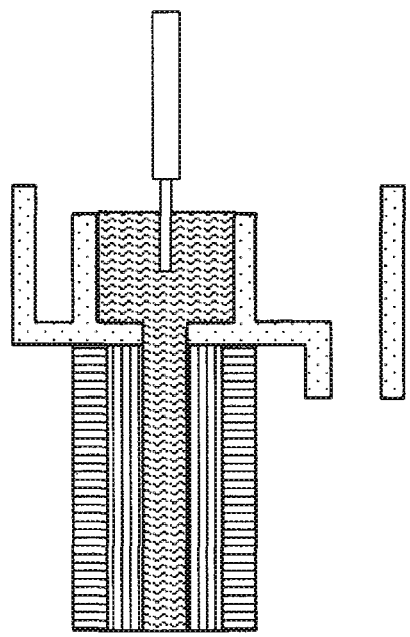
FIG. 13 is a diagram illustrating a state of the sample probe being moved down into the first cleaning solution raised in temperature.

Subsequent to that, as illustrated in FIG. 13, the sample probe 11a is moved down into the first cleaning solution thus supplied (step S115), and then the additional cleaning process is initiated.

Figure 14:
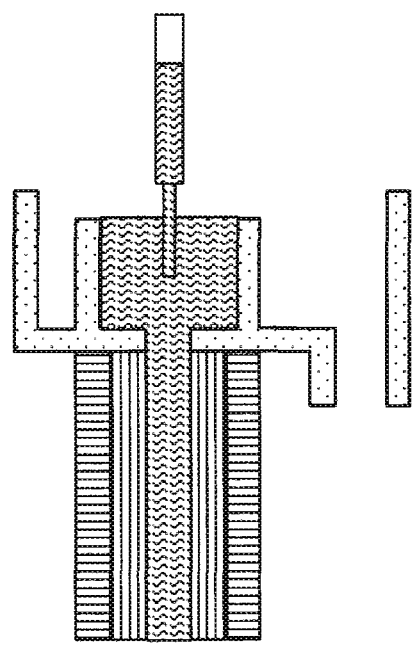
FIG. 14 is a diagram illustrating a state of the sample probe being used to suck the first cleaning solution raised in temperature.

In the additional cleaning process, initially, the suction operation of sucking the cleaning solution through the sample probe 11a is performed as illustrated in FIG. 14 (step S116). Through the suction operation, the liquid level of the first cleaning solution in the reservoir 121 is lowered. Lowering the liquid level of the first solution causes a change of the immersion depth of the sample probe 11a, leading to less cleaning action. In order to avoid a decrease in cleaning action, the sample probe 11a is moved further down as a function of lowering the liquid level, or alternatively, the first cleaning liquid is additionally supplied into the reservoir 121 as a function of the amount of cleaning solution sucked (step S117).

Upon completion of the additional cleaning by immersing the sample probe 11a in the first cleaning solution for a specified length of time, the sample probe 11a is moved up (step S118), and then, the sample probe 11a is moved to the cleaning bath 13 to be cleaned with the second cleaning solution (step S119), and also the contaminated first cleaning solution in the reservoir 111 is replaced with the clean first cleaning solution or the second cleaning solution.

For this purpose, immediately after completion of the additional cleaning operation for the sample probe 11a, it is determined first whether or not a request for subsequent additional cleaning is received (step S120). If it is determined that the request is not received, the power of the heating mechanism 123 is turned OFF (step S124). Then, the contaminated first cleaning solution in the reservoir 121 is replaced with the second cleaning solution (step S125), and then the process is terminated and a transition to an apparatus standby state is made (step S126). The operation of replacing the first cleaning solution with the second cleaning solution is performed for the purpose of cleaning the first cleaning container 23 or the second cleaning container 24 with the second cleaning solution heated by the residual heat remaining in the heating mechanism 123, and also of cooling the heating mechanism 123 with the unheated second cleaning solution.

On the other hand, if it is determined that the request for the additional cleaning is received, the length of time X until the start of the subsequent additional cleaning is calculated (step S121). Then, assume that Y is the length of time that is required for replacement of the first cleaning solution retained in the reservoir 121 with the second cleaning solution and then the subsequent replacement with the first cleaning solution again. It is determined whether or not X>Y (step S122). If X>Y is determined, the contaminated first cleaning solution in the reservoir 121 is replaced with the second cleaning solution (step S123), and the process returns to step S112. If X≤Y is determined, the contaminated first cleaning solution in the reservoir 121 is replaced with the clean first cleaning solution (step S112). In this stage, the power of the heating mechanism 123 is left turned ON.

Figure 15:
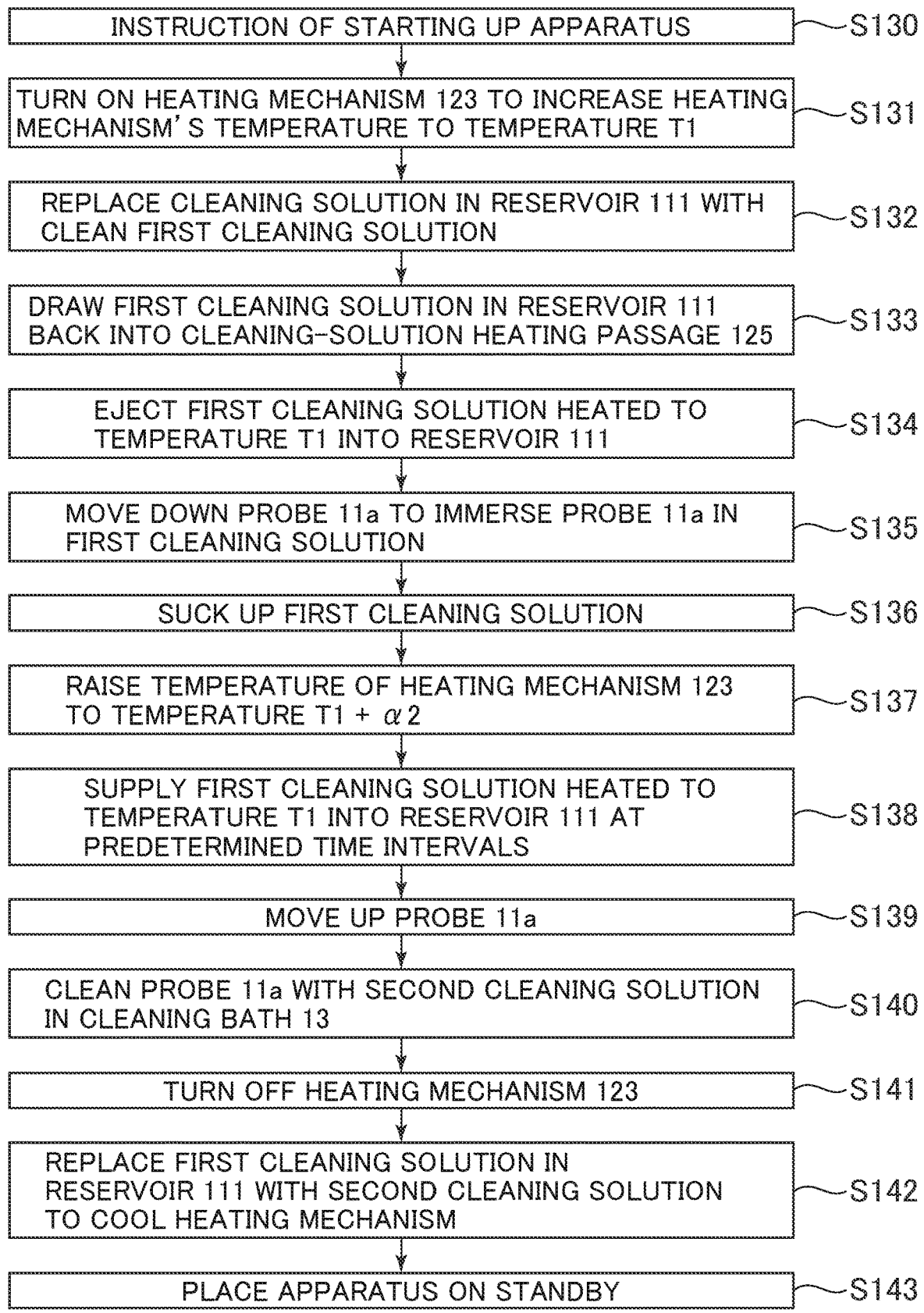
FIG. 15 is a flowchart illustrating the cleaning process on the starting-up of the apparatus.

The cleaning operation for the sample probe 11a upon start-up of the apparatus will now be described with reference to FIG. 15. FIG. 15 is a flowchart illustrating the cleaning process in the start-up of the apparatus.

In the controller 21, upon reception of instruction of starting up the apparatus (step S130), the power of the heating mechanism 123 is concurrently turned ON (step S131).

While the heating mechanism 123 is increasing in temperature to a temperature T1, the second cleaning solution in the reservoir 121 is replaced with the clean first cleaning solution (step S132).

After the to-be-heated piping 124 has reached the preset temperature T1, the first cleaning solution in the reservoir 121 is drawn back into the cleaning-solution heating passage 125 (step S133). The first cleaning solution thus drawn back is retained in the cleaning-solution heating passage 125, and the first cleaning solution is heated to the temperature T1 in a short length of time by means of thermal exchange with the to-be-heated piping 124 after the temperature rise.

The first cleaning solution raised in temperature in the cleaning-solution heating passage 125 is ejected into the reservoir 121 immediately before the sample probe 11a is moved down into the reservoir 121 (step S134). This causes the first cleaning solution heated to a preset temperature T1 to be supplied into the reservoir 121.

Subsequently, the sample probe 11a is moved down into the cleaning solution thus supplied (step S135), then the suction operation of sucking the cleaning solution through the sample probe 11a is performed (step S136). In this stage, the immersion depth of the sample probe from the liquid level of the cleaning solution is similar to that in the above-described additional cleaning process operation.

The immersion cleaning is performed for a pre-specified length of time during the starting-up of the apparatus, but the temperature of the first cleaning solution supplied into the reservoir 121 decreases with the passage of time. Therefore, the first cleaning solution raised in temperature is supplied from the bottom of the reservoir 121 at predetermined time intervals (step S138) in order to maintain the first cleaning solution in the reservoir 121 at a constant temperature during the cleaning of the sample probe 11a.

Here, if the first cleaning solution decreasing (temperature T2) is supplied to the first cleaning solution heated (temperature T1) in a pushing-out manner, this causes concern that the temperature in the reservoir 121 may decrease below the set temperature T1. To avoid this, the temperature of the heating mechanism 123 is set at a temperature only α2 higher than the temperature T1 (i.e., temperature T1+α2) (step S137). As a result, the temperature of the cleaning solution in the reservoir 121 is maintained at around the temperature T1, enabling continuous cleaning with a high degree of cleaning effectiveness.

Upon completion of the immersion cleaning of the sample probe 11a for a specified length of time, the cleaning probe 11a is moved up (step S139), and the cleaning probe 11a is moved to the cleaning bath 13 to be cleaned with the second cleaning solution (step S140), and also the power of the heating mechanism 123 is turned OFF (step S141).

Finally, the contaminated first cleaning solution in the reservoir 121 is replaced with the second cleaning solution (step S142), and then the process is terminated and a transition to an apparatus standby state is made (step S143). Again, the operation of replacing the first cleaning solution with the second cleaning solution is performed for the purpose of cleaning the first cleaning container 23 or the second cleaning container 24 with the second cleaning solution heated by the residual heat remaining in the heating mechanism 123, and also of cooling the heating mechanism 123 with the unheated second cleaning solution.

Figure 16:
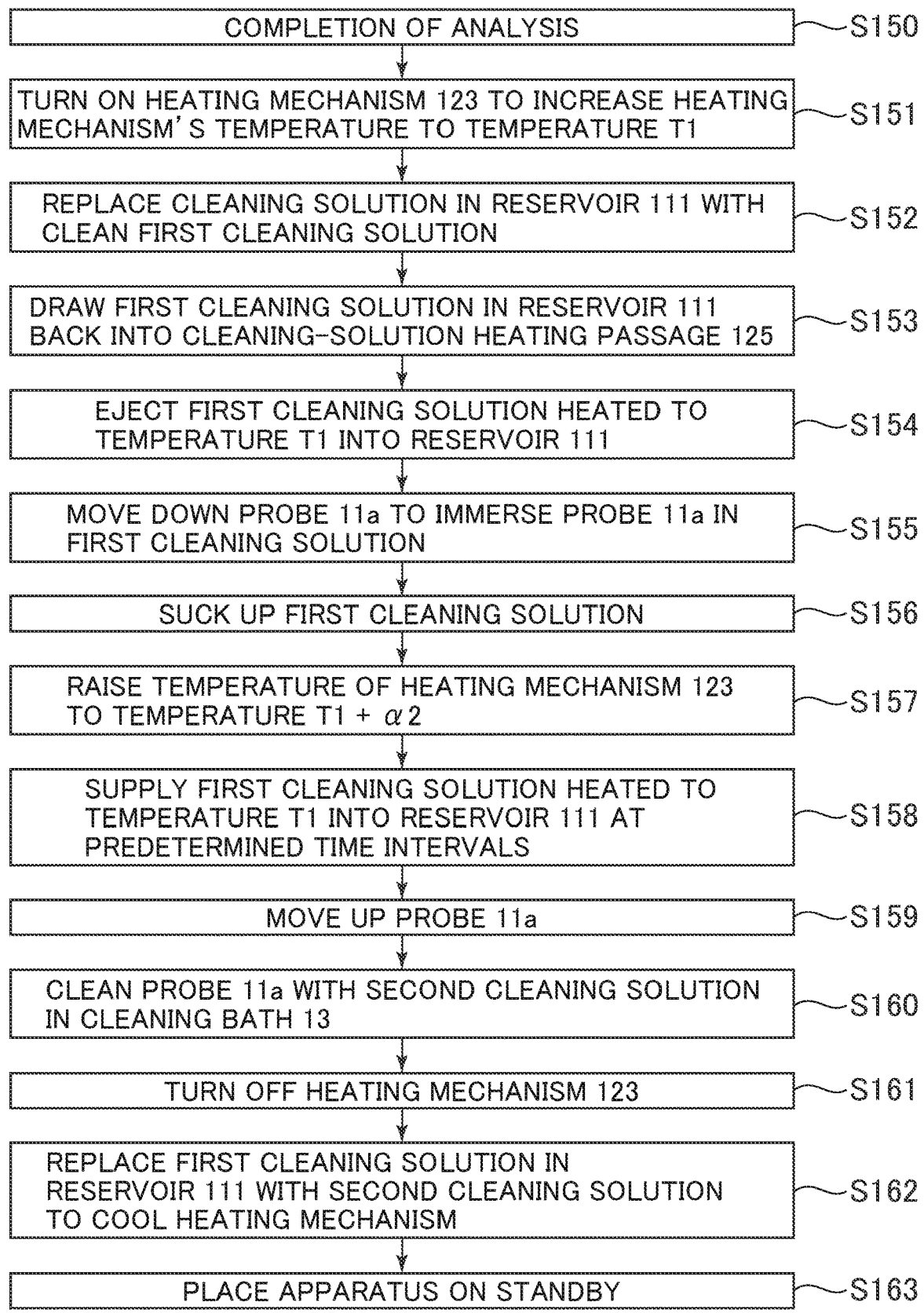
FIG. 16 is a flowchart illustrating the cleaning process when a transition to a standby state is made after the completion of analyses.

The following description using FIG. 16 is of the cleaning operation for the sample probe 11a when a transition to the apparatus standby state is made after the completion of analyses. FIG. 16 is a flowchart illustrating the cleaning process when a transition to the apparatus standby state is made after the completion of analyses.

In the automatic analyzer, the additional cleaning is performed on the sample probe 11a after all the requested analysis processes have been completed and immediately before a transition to the apparatus standby is made.

Initially, in the controller 21, concurrently with the inputting of an instruction of the analysis process completion (step S150), the power of the heating mechanism 123 is turned ON (step S151). The operations in the subsequent steps S152 to S163 are respectively the same as the aforementioned steps S132 to S143 in FIG. 15, and a description is omitted.

Figure 17:
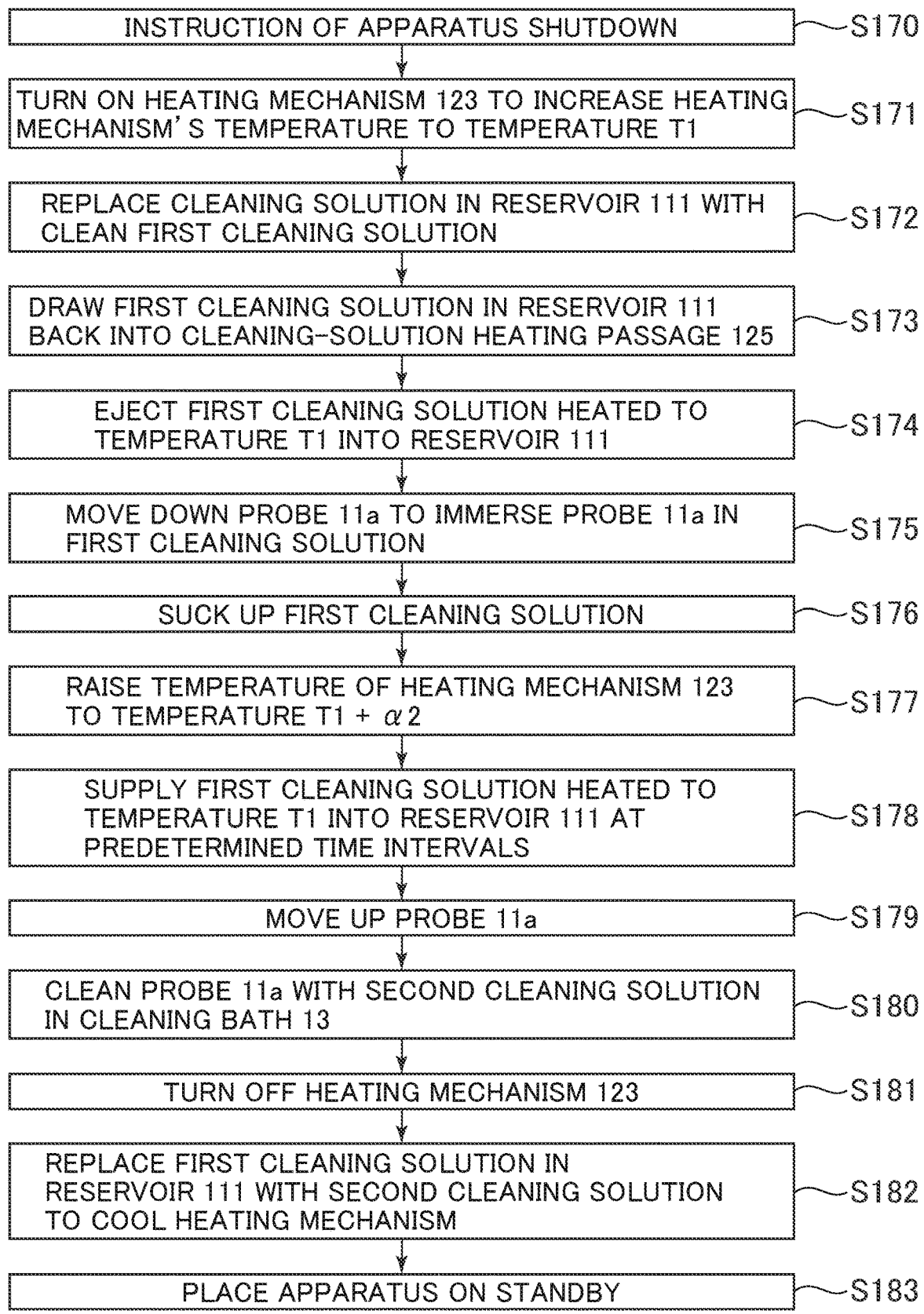
FIG. 17 is a flowchart illustrating the cleaning process on the shutdown of the apparatus.

The following description using FIG. 16 is of the cleaning operation for the sample probe 11a when a transition to the apparatus standby state is made after the completion of analyses. FIG. 17 is a flowchart illustrating the cleaning process on the shutdown of the apparatus.

In the controller 21, concurrently with the inputting of an instruction of the apparatus shutdown (step S170), the power of the heating mechanism 123 is turned ON (step S171). The operations in the subsequent steps S172 to S183 are respectively the same as the aforementioned steps S132 to S143 in FIG. 15, and a description is omitted.

Figure 18:
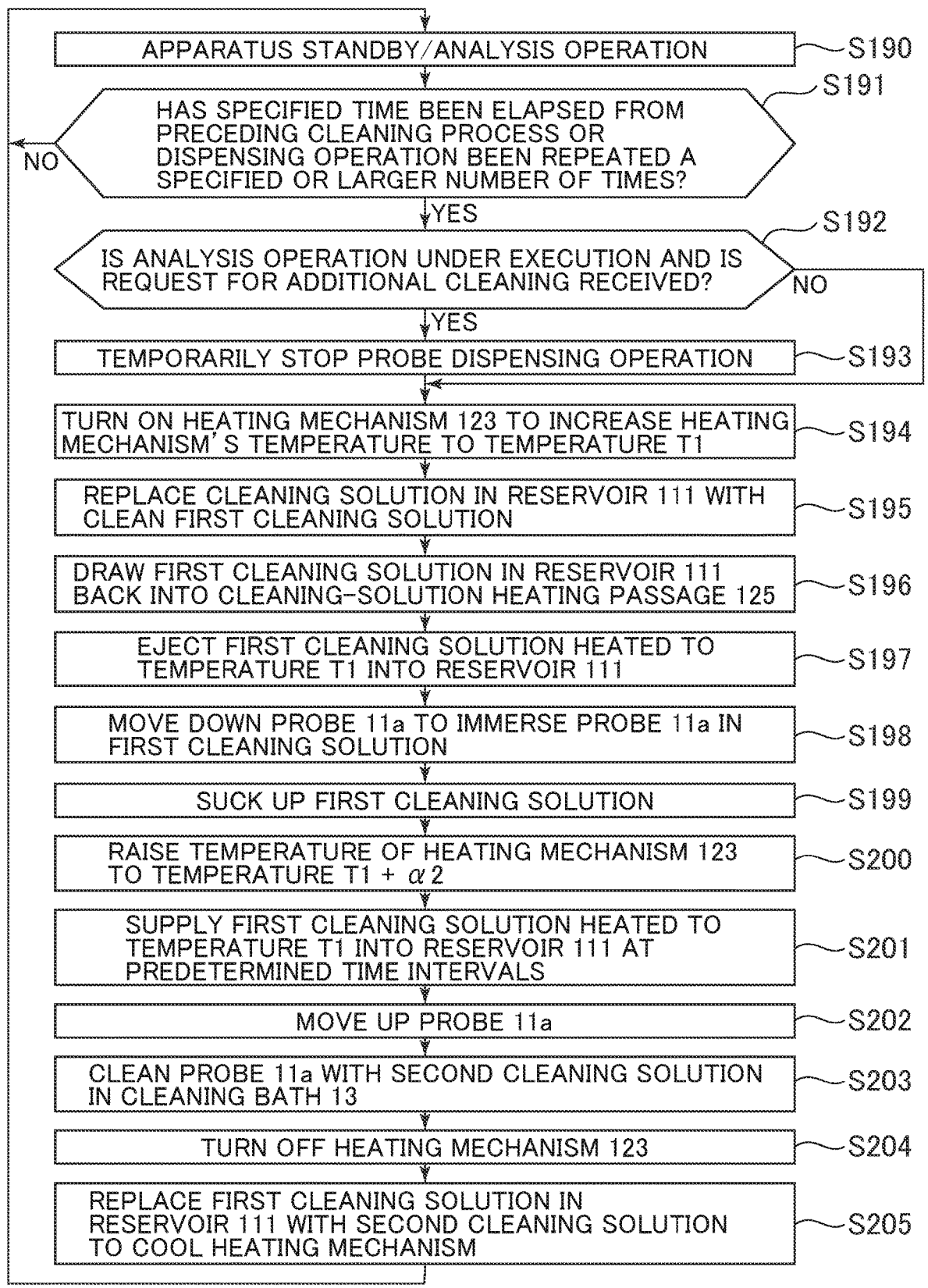
FIG. 18 is a flowchart illustrating the cleaning process where the dispensing operation has been performed for a specified length of time or repeated a specified number of times.

The following description using FIG. 18 is of the cleaning operation for the sample probe 11a where the dispensing operation has been performed for a specified length of time or repeated a specified number of times. FIG. 18 is a flowchart illustrating the cleaning process where the dispensing operation has been performed for a specified length of time or repeated a specified number of times.

In the automatic analyzer, where the dispensing operation has been performed after a specified or longer length of time elapsed from the preceding cleaning process or has been repeated a specified or larger number of times, the additional cleaning operation is performed even during analysis/apparatus standby for the purpose of preventing contaminants from building up on the sample probe 11a.

In the controller 21, initially, it is determined whether or not a specified or longer length of time has been elapsed from the preceding cleaning process or alternatively whether or not the dispensing operation has been repeated a specified or larger number of times (step S191). It is determined that a specified or longer length of time has been elapsed or alternatively that the dispensing operation has been repeated a specified or larger number of times, the process goes to step S192 for a transit to the additional cleaning process operation for the sample probe 11a. On the other hand, otherwise, the additional cleaning is unnecessary, so that the process returns to step S191.

Then, it is determined whether or not the analysis operation is under execution and a request for additional cleaning is received (step S192). If it is determined that the analysis operation is under execution and the request for the additional cleaning is received, the dispensing operation of the sample probe 11a is temporarily stopped (step S193), and the additional cleaning process is performed (step S194 and afterward). On the other hand, if it is determined that the analysis operation is not executed or that the request for the additional cleaning is not received, the additional cleaning is directly performed (step S194 and afterward). The operations in the subsequent steps S194 to S205 are respectively the same as the aforementioned steps S132 to S143 in FIG. 15, and a description is omitted.

Figure 19:
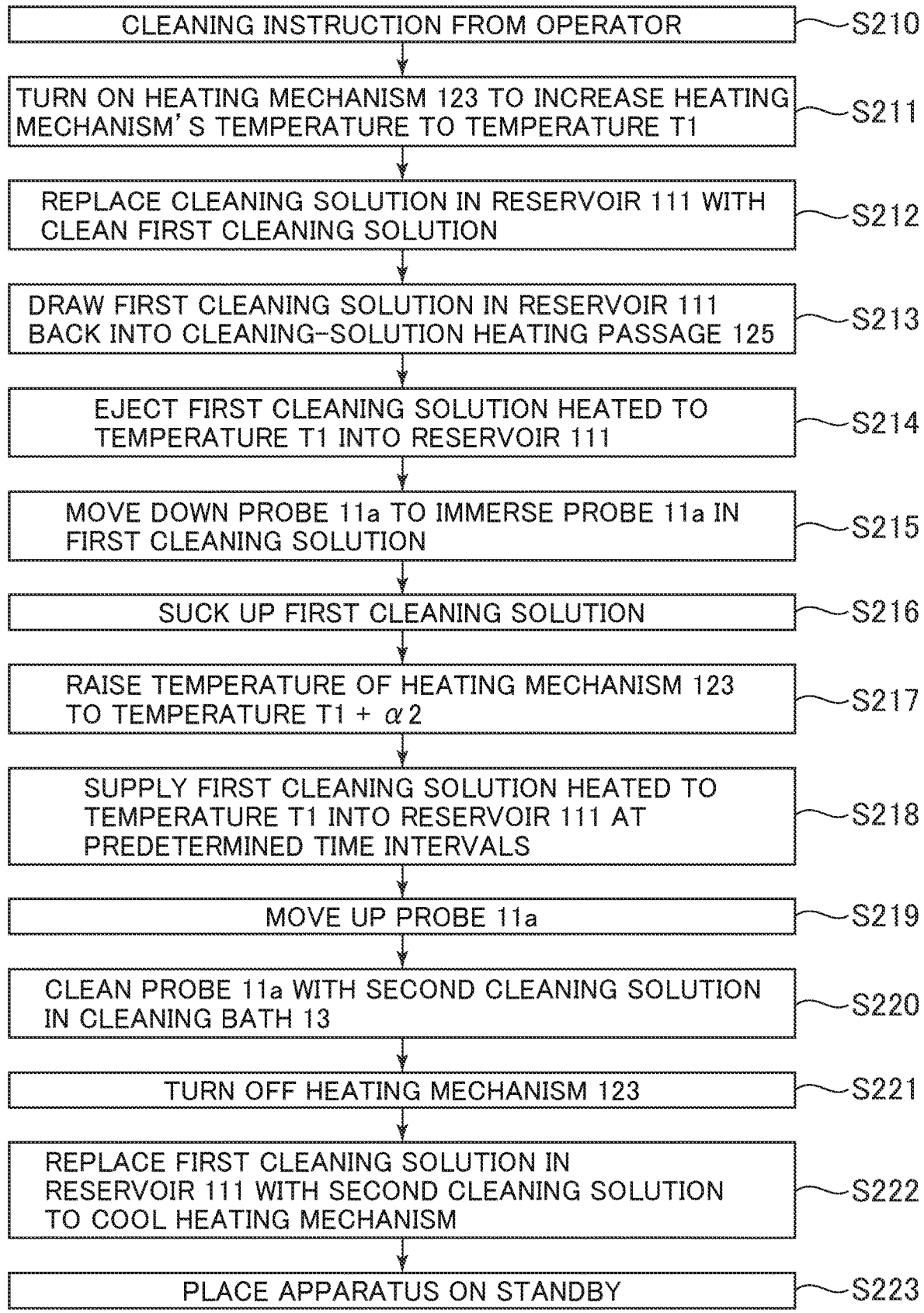
FIG. 19 is a flowchart illustrating the cleaning process where an instruction is received from an operator.

The following description using FIG. 19 is of the cleaning operation for the sample probe 11a where an instruction is received from an operator. FIG. 19 is a flowchart illustrating the cleaning process where an instruction is received from an operator.

Where the controller 21 recognizes that an instruction to clean the sample probe 11a has been received from the operator during apparatus standby (step S210), the controller 21 performs the additional cleaning operation on the sample probe 11a. The operations in the subsequent steps S211 to S223 are respectively the same as the aforementioned steps S131 to S143 in FIG. 15, and a description is omitted.

Figure 20:
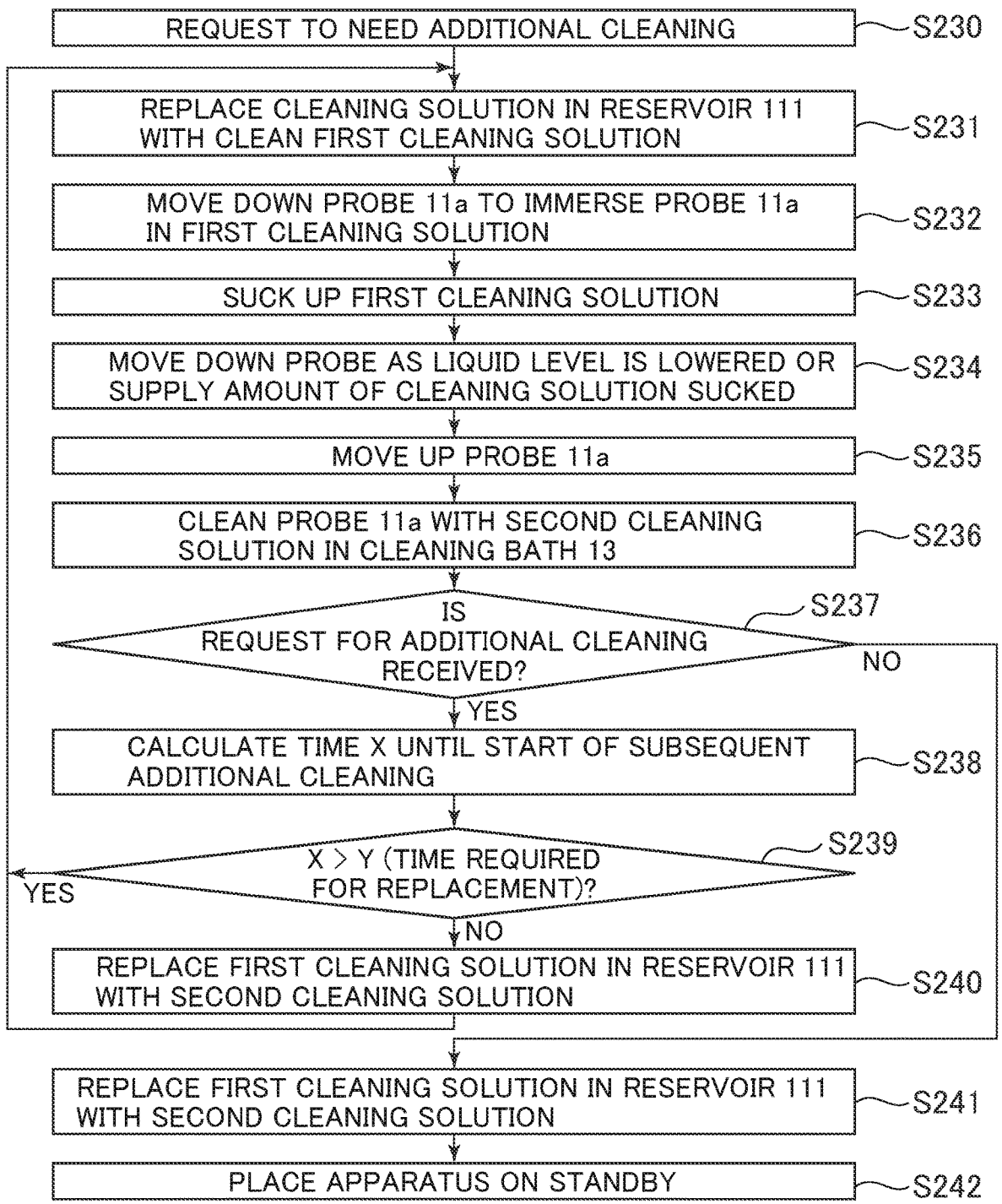
FIG. 20 is a flowchart illustrating the cleaning process where the cleaning solution is not required to be heated.

The following description using FIG. 20 is of the cleaning operation for the sample probe 11a where heating the cleaning solution is not required but cleaning is required in the first cleaning container 23. FIG. 20 is a flowchart illustrating the cleaning process where heating the cleaning solution is not required.

Where the controller 21 recognizes that a request to perform measurement of a pre-registered analysis item on a sample in a pre-registered specimen category is received, the controller 21 determines whether or not the degree of cleaning effectiveness as much as that provided by a cleaning solution raised in temperature is necessary for measurement of the item, if unnecessary (step S230), the additional cleaning is performed on the sample probe 11a with the power of the heating mechanism 123 turned OFF.

In the controller 21, then, the first cleaning solution or the second cleaning solution in the reservoir 121 is replaced with the clean first cleaning solution (step S231).

After that, the sample probe 11a is moved down into the first cleaning solution thus supplied (step S232) to perform the additional cleaning process. In this stage, the immersion depth of the sample probe from the liquid level of the cleaning solution is set similarly to that in the aforementioned step S115.

The suction operation of sucking the cleaning solution through the sample probe 11a is performed (step S233), whereupon the liquid level of the first cleaning solution in the reservoir 121 is lowered. Because of this, similarly to step S117 in FIG. 15, the probe is moved further down as a function of lowering the liquid level, or alternatively, the first cleaning liquid is supplied into the reservoir 121 as a function of the amount of cleaning solution sucked (step S234).

Upon completion of the additional cleaning by immersing the sample probe 11a in the first cleaning solution for a specified length of time, the sample probe 11a is moved up (step S235), and then, the sample probe 11a is moved to the cleaning bath 13 to be cleaned with the second cleaning solution (step S236), and also the contaminated first cleaning solution in the reservoir 111 is replaced with the clean first cleaning solution or the second cleaning solution.

For this purpose, immediately after completion of the additional cleaning operation for the sample probe 11a, it is determined first whether or not a request for subsequent additional cleaning is received (step S237). If it is determined that the request is not made, the contaminated first cleaning solution in the reservoir 121 is replaced with the second cleaning solution (step S241), and then the process is terminated and a transition to an apparatus standby state is made (step S242).

On the other hand, if it is determined that the request for the additional cleaning is received, a time X until the start of the subsequent additional cleaning is calculated (step S238). Specifically, assume that Y is the time required for replacement of the first cleaning solution in the reservoir 121 with the second cleaning solution and the subsequent replacement with the first cleaning solution again. It is determined whether or not X>Y (step S239). If X>Y is determined, the contaminated first cleaning solution in the reservoir 121 is replaced with the second cleaning solution (step S240), and the process returns to step S231. If X≤Y is determined, the contaminated first cleaning solution in the reservoir 121 is replaced with the clean first cleaning solution (step S240).

Advantageous effects of the embodiment will now be described.

In the above-described embodiment of the automatic analyzer according to the present invention, after the first cleaning solution is caused to overflow from the first cleaning container 23 or the second cleaning container 24, the first cleaning solution is temporarily drawn back into the cleaning-solution heating passage 125 in order to be heated by the heating mechanism 123. Then, after the heating, the heated first cleaning solution is re-supplied to the first cleaning container 23 or the second cleaning container 24.

With such a configuration, as compared with conventionally practiced methods including a method of discharging the cleaning solution in the reservoir prior to a supply of a high-temperature cleaning solution and a method of supplying a high-temperature cleaning solution in the manner of pushing out the cleaning solution from the reservoir, there is no need to add mechanisms such as an electromagnetic valve and/or the like more than necessary and to reduce the consumption of the cleaning solution as well as to heat the cleaning solution to a predetermined temperature or higher. Accordingly, the heated cleaning solution can be supplied to the cleaning bath with efficiency and in a short length of time, enabling more efficient additional cleaning with a heated cleaning solution being performed on a dispensing probe.

Further, after cleaning the reagent probe 7a, 8a or the sample probe 11a, 12a, it is determined whether or not a request for subsequent cleaning of the reagent probe 7a, 8a or the sample probe 11a, 12a with the heated first cleaning solution is received. If it is determined that the request is received, then the length of time until the start of the subsequent cleaning is calculated and it is determined whether the first cleaning solution retained in the first cleaning container 23 or the second cleaning container 24 should be replaced with a fresh first cleaning solution or with a second cleaning solution. Because of this, the cleaning-solution replacement operation suitable for the length of time until the subsequent additional cleaning is made possible, enabling the operational management for the additional cleaning in the first cleaning container 23 and the second cleaning container 24 as circumstances demand.

Further, the reagent probe 7a, 8a or the sample probe 11a, 12a is additionally moved down as a function of lowering the liquid level of the first cleaning solution due to the reagent probe 7a, 8a or the sample probe 11a, 12a sucking the first cleaning solution during the cleaning operation for the reagent probe 7a, 8a or the sample probe 11a, 12a. Alternatively, the first cleaning solution is additionally supplied as a function of the amount of the first cleaning solution sucked by the reagent probe 7a, 8a or the sample probe 11a, 12a during the cleaning operation for the reagent probe 7a, 8a or the sample probe 11a, 12a. As a result, the cleaned region of the reagent probe 7a, 8a or the sample probe 11a, 12a can be ensured with reliability, enabling further effective additional cleaning with a heated cleaning solution.

Further, the cleaning-solution heating passage 125 is formed of the to-be-heated piping 124 of a slender shape capable of raising the temperature of the first cleaning solution or the second cleaning solution in a uniform manner in a short length of time, and the heating mechanism 123 is placed around the to-be-heated piping 124. As a result, rapidly heating the cleaning solution enables the additional cleaning of a dispensing probe with a heated cleaning solution in a shorter length of time and with efficiency.

Further, the volume 128 of the first cleaning solution or the second cleaning solution retained in the cleaning-solution heating passage 125 is greater than the volume 127 of the first cleaning solution or the second cleaning solution retained in the reservoir 121. As a result, when the cleaning solution is drawn back into the cleaning-solution heating passage 125 to be heated, all the first cleaning solution in the reservoir 121 can be heated, so that the first cleaning solution used in the additional cleaning is allowed to reach a predetermined temperature with reliability, enabling the additional cleaning of a dispensing probe with a heated cleaning solution in a shorter length of time and with efficiency.

Further, when the reagent probe 7a, 8a or the sample probe 11a, 12a is cleaned by being immersed in the first cleaning solution, the temperature of the first cleaning solution is raised higher than that when the reagent probe 7a, 8a or the sample probe 11a, 12a is cleaned with the heated first cleaning solution. As a result, the temperature of the cleaning solution in the reservoir 121 can be inhibited from decreasing lower than the predetermined temperature with reliability, enabling greater effective additional cleaning with a heated cleaning solution.

Further, when the reagent probe 7a, 8a or the sample probe 11a, 12a is cleaned by being immersed in the first cleaning solution or the second cleaning solution, the heated first cleaning solution or second cleaning solution is supplied to the first cleaning container 23 or the second cleaning container 24 at predetermined time intervals. As a result, the temperature of the cleaning solution in the reservoir 121 can also be inhibited from decreasing lower than the predetermined temperature with reliability, enabling greater effective additional cleaning with a heated cleaning solution.

Further, the heating mechanism 123 is raised in temperature after it is determined that a request for cleaning of the reagent probe 7a, 8a or the sample probe 11a, 12a with the heated first cleaning solution or second cleaning solution is received. As a result, the heating mechanism 123 is not required to be heated to higher-than-necessary temperatures, enabling a reduction in influence on apparatus operation management.

It should be understood that the present invention is not limited to the above-described embodiment and various modifications, applications are possible. The above-described embodiment has been described in detail for the purpose of explaining the present invention clearly, and the present invention is not necessarily limited to including all the components and arrangement described above.

LIST OF REFERENCE SIGNS

1 . . . Reaction disk
2 . . . Reaction container

3 . . . Cleaning mechanism
4 . . . Spectrophotometer
4a . . . Light source
5, 6 . . . Agitation mechanism
7, 8 . . . Reagent dispensing mechanism
7a, 8a . . . Reagent probe
9 . . . Reagent disk
10 . . . Reagent bottle
11 . . . First sample dispensing mechanism
11a . . . Sample probe
11b . . . Distal end
12 . . . Second sample dispensing mechanism
12a . . . Sample probe
13, 14 . . . Sample probe cleaning bath
15 . . . Sample container
15a . . . Sample
16 . . . Sample rack
17 . . . Sample transfer mechanism
18 . . . Reagent pump
19 . . . Sample pump
20 . . . Cleaning pump
21 . . . Controller
23 . . . First cleaning container
24 . . . Second cleaning container
30, 31 . . . Agitation mechanism cleaning bath
32, 33 . . . Reagent probe cleaning bath
51 . . . Cleaning-solution supply syringe
52 . . . Cleaning-solution supply pump
52A . . . Cleaning-solution storage tank
53, 54 . . . First cleaning solution storage tank
56, 57 . . . Cleaning-solution residual-amount sensor
58 . . . First branch pipe
59 . . . Second branch pipe
60, 61, 62, 63, 64, 65, 66 . . . Electromagnetic valve
67 . . . Cleaning mechanism
100 . . . Automatic analyzer
101 . . . Reaction disk
110 . . . Cleaning-solution supply mechanism
111 . . . Reservoir
121 . . . Reservoir
122 . . . Lower opening
123 . . . Heating mechanism
124 . . . To-be-heated piping
125 . . . Cleaning-solution heating passage
126 . . . Cleaning-solution supply port
127, 128 . . . Volume

The invention claimed is:

1. An automatic analyzer that dispenses a sample and a reagent into each reaction container to initiate a reaction and then measures the reacted liquid, the automatic analyzer comprising:
a dispensing probe for dispensing a reagent or a sample to be analyzed into the reaction container;
a cleaning container including a reservoir;
a cleaning-solution supply unit that supplies a first cleaning solution to the cleaning container through a passage leading to the cleaning container, the cleaning-solution supply unit includes two first cleaning solution tanks each connected to a first branch pipe via respective lines, the first branch pipe merging the respective lines to a single first line connected to a second branch pipe via a first electromagnetic valve, the cleaning-solution supply unit further including a second cleaning solution tank, a syringe, a second line connected to the second branch pipe and the syringe, the passage connected to second branch pipe via a second electromagnetic valve;
a heating unit that is thermally connected to the passage to heat the passage; and
a controller connected to the dispensing probe, the cleaning-solution supply unit and the heating unit, the controller programmed to:
control at least the syringe, first electromagnetic valve and the second electromagnetic valve of the cleaning-solution supply unit to supply the first cleaning solution to the reservoir of the cleaning container from at least one of the two first cleaning solution tanks via at least the first branch pipe and the second branch pipe thereby causing the first cleaning solution held in the reservoir of the cleaning container to overflow from the reservoir,
after controlling the cleaning-solution supply unit to supply the first cleaning solution to the reservoir of the cleaning container thereby causing the first cleaning solution held in the reservoir of cleaning container to overflow from the reservoir, control at least the syringe, first electromagnetic valve and the second electromagnetic valve of the cleaning-solution supply unit to draw in the first cleaning solution from the reservoir of the cleaning container into at least the passage and the second branch pipe,
control the heating unit to heat the passage containing the first cleaning solution drawn into the passage,
control at least the syringe, first electromagnetic valve and the second electromagnetic valve of the cleaning-solution supply unit to supply the heated first cleaning solution drawn into the passage into the cleaning container,
control the dispensing probe to immerse a portion of the dispensing probe into the cleaning solution, and
after controlling the dispensing probe to immerse the portion of the dispensing probe into the cleaning solution, control at least the syringe, and the second electromagnetic valve of the cleaning-solution supply unit to deliver the second cleaning solution from the second cleaning solution tank into the cleaning container via at least the second line, the second branch pipe and the passage, thereby replacing the first cleaning solution with the second cleaning solution.

2. The automatic analyzer according to claim 1, wherein the controller is programmed to:
after immersing the portion of the dispensing probe into the first cleaning solution, determine whether a request for subsequent cleaning of the dispensing probe with a heated first cleaning solution is received, and upon determining the request is received, calculate a length of time until start of the subsequent cleaning, and based on the calculated length of time, determine whether the first cleaning solution retained in the cleaning container is replaced.

3. The automatic analyzer according to claim 1, wherein the controller is programmed to control the dispensing probe such that the dispensing probe is moved downward upon lowering a liquid level of the first cleaning solution due to the dispensing probe sucking the cleaning solution during a cleaning operation for the dispensing probe.

4. The automatic analyzer according to claim 1, wherein the controller is programmed to control the cleaning-solution supply unit such that the first cleaning solution is additionally supplied as a function of an amount of the first cleaning solution sucked by the dispensing probe during a cleaning operation for the dispensing probe.

5. The automatic analyzer according to claim 1,
wherein the passage is formed of piping, and
wherein the heating unit covers a perimeter of the piping.

6. The automatic analyzer according to claim 1,
wherein the first cleaning solution retained in the passage is larger in volume than the first cleaning solution retaining in the cleaning container.

7. The automatic analyzer according to claim 1,
wherein the controller is programmed to control the cleaning-solution supply unit to supply the heated first cleaning solution to the cleaning container at predetermined time intervals when the dispensing probe is cleaned by being immersed in the first cleaning solution.

8. The automatic analyzer according to claim 1,
wherein the dispensing probe is either a sample probe for dispensing the sample from a sample container into the reaction container or a reagent probe for dispensing the reagent from a reagent bottle into the reaction container.

9. The automatic analyzer according to claim 1, wherein the controller is programmed to:
determine whether there is a request to clean the dispensing probe by a next heated cleaning solution, which is different from the first cleaning solution, after controlling the dispensing probe to immerse a portion of the dispensing probe, and upon determining there is no request, stop heating of the heating unit.

* * * * *